Patented Nov. 2, 1948

2,453,100

UNITED STATES PATENT OFFICE 2,453,100

CARBALKOXY AMINOANTHRAQUINONE SULFONAMIDES

Edgar E. Renfrew, Jr., Phillipsburg, N. J., assignor to General Aniline & Film Corporation, New York, N. Y., a corporation of Delaware No Drawing. Application June 21, 1946, Serial No. 678,357

3 Claims. (Cl. 260—372)

This invention relates to new compounds, more particularly to improved acid dyestuffs of the aminoanthraquinone series which in the free state may be represented by the general formula:

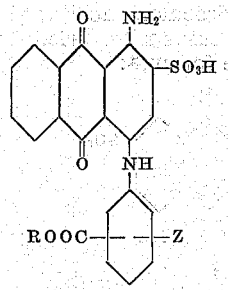

wherein R represents an alkyl radical and Z a sulfonamide radical which may be of the formula:

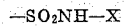

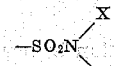

or

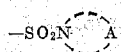

wherein X and Y each represent a saturated aliphatic radical, such as alkyl radicals or alkyl radicals containing carboxy, carbalkoxy, alkoxy, acyloxy, hydroxy, halogen, sulfo and secondary and tertiary alkylamino groups, or an aromatic radical of the benzene, naphthalene and hydrogenated naphthalene series, and A represents a bivalent alkylene radical which with the nitrogen atom on the sulfonyl group constitutes a 5 to 7 membered heterocyclic ring.

The new carbalkoxy aminoanthraquinone sulfonamides dye animal and nylon (super-polyamide) fibers from acid or neutral bath reddish-blue to blue to greenish-blue clear shades of good fastness properties. They are characterized by dyeing deeper shades from neutral bath than the corresponding carboxylic aminoanthraquinone sulfonamides, a valuable property advantageous in the union dyeing of fabrics containing fibers which become tendered on treatment with acid, such as cotton and rayon.

The new ester compounds may be prepared by esterifying the corresponding carboxylic amino- anthraquinone sulfonamides of the general formula:

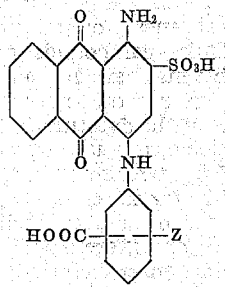

wherein Z has the significance aforesaid. The esterification can be carried out in known manner with the aid of an acid catalyst, such as hydrochloric or sulfuric acid. For the formation of the ester group or groups, unsubstituted aliphatic monohydric alcohols are employed, for example, methyl alcohol, ethyl alcohol, isopropyl alcohol, n-butyl alcohol, isobutyl alcohol, sec.-n-butyl alcohol, tert. butyl alcohol, n-hexyl alcohol, 2-ethyl-n-hexyl alcohol, n-octyl alcohol, etc.

The carboxylic aminoanthraquinone sulfonamides serving as starting materials for the production of the new dyestuffs may be prepared by bringing together in an aqueous medium 1-amino-4-bromo-anthraquinone-2-sulfonic acid sodium salt, an aminobenzenesulfonamide, a hydrogen ion acceptor, such as sodium carbonate or bicarbonate, and a catalyst, such as copper, cuprous or cupric salts, e. g., cuprous chloride, and heating until condensation is complete. The product sulfonamide may be isolated and thereafter purified by means of well-known procedures.

The aminobenzenesulfonamides employed in the production of the carboxylicamino-anthraquinone sulfonamides may be prepared by reacting chlorobenzoic acid with chlorosulfonic acid to obtain the carboxychlorobenzenesulfonylchloride, which, in turn, is reacted with the selected primary or secondary amino compound or alicyclic imine to produce the carboxychlorobenzenesulfonamide. The latter is then aminated with ammonium hydroxide in the presence of a copper catalyst, e. g., copper sulfate, to obtain the desired aminobenzenesulfonamide.

Among the amino compounds which may be employed for the preparation of the afore-defined aminobenzenesulfonamides are, for example, mono- and di-methyl amine, mono- and di-ethyl amine, mono- and di-isopropyl amine, cyclohexylamine, hexahydrobenzylamine, hexahydroanthranilic acid, N-methyl glycine, glycine, alanine, ethyl - ω - aminocaproate, taurine, N - methyl taurine, β-aminoethyl acetate, mono- and diethanolamine, β-ethoxyethylamine, β-bromoethylamine, p-toluidine, 4-amino-o-xylene, 2-nitro-p-anisidine, o-, m- or p-aminobenzoic acid, 5-aminosalicylic acid, 2-amino-4-methylbenzoic acid, 5-nitro-2-aminobenzoic acid, 2-chloro-p-aminobenzoic acid, aniline-o-, m- or p-sulfonic acid, p-phenylenediamine, 1-hydroxy-4-amino-2-naphthoic acid, 3-hydroxy-7-amino-2-naphthoic acid, ac.-tetrahydro-α-naphthylamine, and ar.-tetrahydro-α-naphthylamine, etc. Among the alicyclic imines suitable for the preparation of the aminobenzenesulfonamides may be mentioned, for example, tetramethylene imine (pyrrolidine), pentamethylene imine (piperidine), 2- and 3-methylpiperidine, hexamethylene imine, etc.

The new ester dyestuffs may also be prepared following the process for the preparation of the carboxylic aminoanthraquinone sulfanamides with the exception that instead of employing the carboxy-aminobenzenesulfonamides, the correspondng carbalkoxy compounds are employed. Proceeding in this manner for their preparation, more than one ester group may be introduced into the molecule of the dyestuffs by starting with carbalkoxy-aminobenzenesulfonamides from the condensation of a carbalkoxy-aminobenzenesulfonylchloride with, for example, an aminobenzoic acid-alkylester, the ester-alkyl radical of which may be the same or different than that of the carbalkoxy - aminobenzenesulfonylchloride. For example, 5-sulfonchloride-anthranilic acid-ethylester may be condensed with the methyl-, ethyl-, n-butyl, isobutyl-, isoamyl- or other alkylester of anthranilic acid for the production of intermediate carbalkoxy-aminobenzenesulfonamides containing more than one alkylester group.

The invention and the preparation of the intermediate carboxylic aminoanthraquinone sulfonamides is further illustrated by the following specific examples, to which, however, it is not intended that it be limited. Parts are by weight.

Example 1

A solution of 25 parts of 5-(2'-carboxyphenylsulfamyl)-anthranilic acid in 300 parts of water containing 30.2 parts of sodium bicarbonate was added to 20.2 parts of 1-amino-4-bromoanthraquinone-2-sulfonic acid sodium salt in 200 parts of water. 1.5 parts of cuprous chloride was then added and the mixture heated under stirring at 75° C. for 18 hours. At the end of this time the mixture was a deep ruby color to which, after cooling, was added 60 parts of concentrated hydrochloric acid. The dyestuff settled out in the form of large non-sticky masses which were isolated by decantation.

To purify the dyestuff, it was dispersed in 500 parts of water at 60° C., the resulting solution filtered, and to the deeply blue filtrate at 60° C. was added sufficient sodium chloride to precipitate the dyestuff. After separation by filtration, the dyestuff was again subjected to the dissolution and precipitation steps, whereupon the precipitate was washed with sodium chloride solution (10% aqueous). The purified dyestuff was dried at 90° C. and ground. It has the formula:

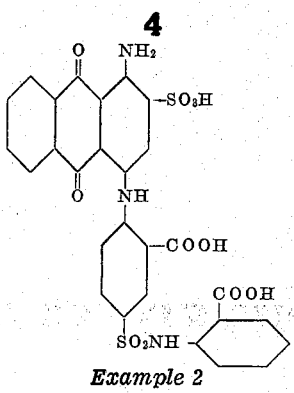

*Example 2*

360 parts of absolute ethyl alcohol and 6 parts of the carboxylic aminoanthraquinone sulfonamide of Example 1 were placed in a reaction vessel equipped with a reflux condenser and an ice-salt cooling bath. Dry hydrogen chloride was passed rapidly into the well-stirred cool contents of the reaction vessel, saturation being reached in approximately 90 minutes. The flow of HCl gas was shut off, cooling removed and the mixture heated at reflux temperature (80° C.) for 24 hours. The reflux condenser was exchanged for a downward distillation condenser and the unreacted alcohol removed by distillation. To the red residue was added 100 parts of water and sufficient ammonia to give a faintly basic mixture. A few drops of hydrochloric acid was added and the nearly neutral suspension dried. The dyestuff product has the formula:

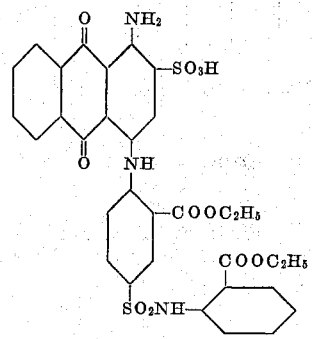

and dyes wool and nylon in beautiful bright blue shades of good properties. From the neutral bath it gave deeper shades than did the unesterified starting dyestuff.

*Example 3*

A mixture of 80 parts of n-butyl alcohol, 5 parts of the starting carboxylic aminoanthraquinone sulfonamide of Example 1 and 9 parts of concentrated sulfuric acid was heated at the boiling point under reflux for 12 hours. The reaction mixture was cooled, filtered and the cake stirred with 50 parts of water and sufficient ammonia to give a faintly alkaline mixture. The slurry was evaporated to dryness and the desiccate ground.

The product dyestuff has the formula:

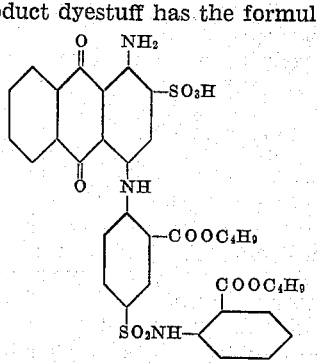

and dyes wool in bright blue shades. The new dyestuff gives distinctly deeper shades than the unesterified starting dyestuff when dyeing by the neutral bath.

*Example 4*

Into 80 parts of absolute ethanol was placed 5 parts of the carboxylic dyestuff of the formula, 1-aminoanthraquinone - 4 - N-[5'-diethylsulfamyl-anthranilic acid]-2-sulfonic acid. 9 parts of concentrated sulfuric acid was added, and the mixture stirred at the boiling point for 12 hours under reflux. The reaction mixture was cooled, filtered and the cake stirred with 50 parts of water and enough ammonia to give a faintly alkaline mixture. The slurry was evaporated to dryness. The product has the formula:

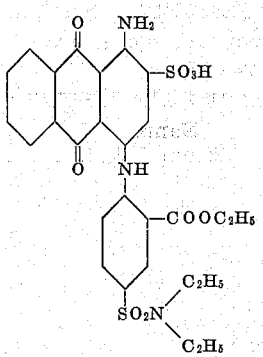

and dyes wool attractive blues shades from the neutral or the acid bath. The new ester dyestuff gives deeper shades from the neutral bath than does the corresponding carboxylic dyestuff employed as starting material.

*Example 5*

A mixture of 80 parts of absolute ethanol, 5 parts of the carboxylic compound of the formula, 1-aminoanthraquinone - 4 - N - [5'-(cyclohexylsulfamyl) - anthranilic acid]-2-sulfonic acid, and 9 parts of concentrated sulfuric acid was heated under reflux at the boiling temperature for 12 hours. The product was isolated as in Example 4. It has the formula:

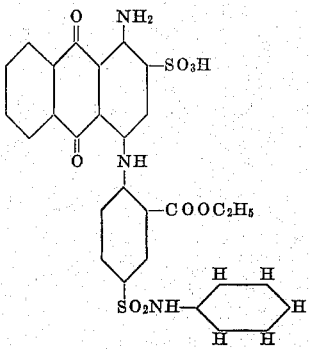

and dyes wool well from the neutral bath in reddish-blue shade.

*Example 6*

A mixture of 80 parts of isopropyl alcohol, 5 parts of the carboxylic compound of the formula, 1 - aminoanthraquinone - 4 - N - [5'-(p''-tolylsulfamyl)-anthranilic acid]-2-sulfonic acid, and 9 parts of concentrated sulfuric acid was heated under reflux at the boiling point for 12 hours. The product was isolated in a manner similar to that described in Example 4. The product has the formula:

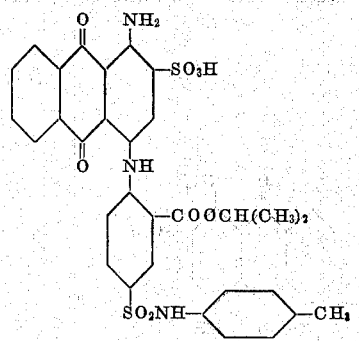

and dyes wool attractive deep blue shades from both the neutral and the acid bath.

*Example 7*

A mixture of 80 parts of methyl alcohol and 5 parts of the carboxylic compound of the formula, 1-aminoanthraquinone-4-N-[5' - (o'' - anisylsulfamyl)-anthranilic acid]-2-sulfonic acid, and 9 parts of concentrated sulfuric acid was heated under reflux at the boiling point for 12 hours. The product was isolated by the method of Example 4.

It has the formula:

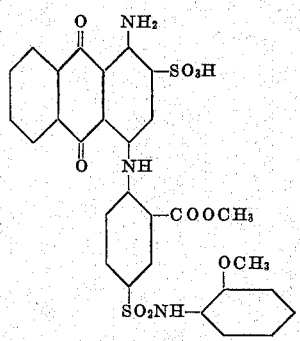

and dyes wool rich greenish-blue shades from either the neutral or the acid bath.

As various other embodiments of the invention will occur to those skilled in the art, it is not intended that the scope of the patent be limited except as is required by the prior art and the appended claims.

I claim:

1. An aminoanthraquinone compound of the general formula:

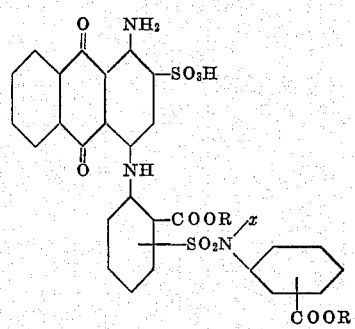

wherein R represents the same lower alkyl radical and x represents a radical selected from the group consisting of hydrogen and lower alkyl.

2. The amino anthraquinone compound of the formula:

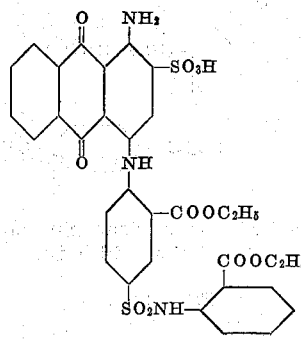

3. The aminoanthraquinone compound of the formula:

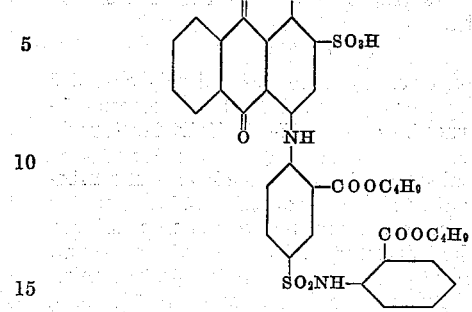

EDGAR E. RENFREW, JR.

REFERENCES CITED

The following references are of record in the file of this patent:

UNITED STATES PATENTS

| Number | Name | Date |
|---|---|---|
| 2,195,067 | Weinand et al. | Mar. 26, 1940 |